United States Patent
Nomura

(10) Patent No.: US 12,073,046 B2
(45) Date of Patent: Aug. 27, 2024

(54) POSITION DETECTION CIRCUIT, POSITION DETECTION SYSTEM, AND POSITION DETECTION METHOD IN WHICH OUTPUT OF TOUCH POSITION IS TEMPORARILY INHIBITED

(71) Applicant: Wacom Co., Ltd., Saitama (JP)

(72) Inventor: Yoshio Nomura, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/150,696

(22) Filed: Jan. 5, 2023

(65) Prior Publication Data
US 2023/0229265 A1    Jul. 20, 2023

(30) Foreign Application Priority Data

Jan. 17, 2022  (JP) ................. 2022-005230

(51) Int. Cl.
*G06F 3/041*   (2006.01)
*G06F 3/0354*  (2013.01)
*G06F 3/038*   (2013.01)
*G06F 3/044*   (2006.01)

(52) U.S. Cl.
CPC ...... *G06F 3/04186* (2019.05); *G06F 3/03545* (2013.01); *G06F 3/0383* (2013.01); *G06F 3/0441* (2019.05); *G06F 3/0442* (2019.05)

(58) Field of Classification Search
CPC ................................................ G06F 3/04186
See application file for complete search history.

(56) References Cited

U.S. PATENT DOCUMENTS

| | | | | |
|---|---|---|---|---|
| 6,518,957 B1* | 2/2003 | Lehtinen | ............... | G06F 1/1626 |
| | | | | 345/173 |
| 2014/0298266 A1* | 10/2014 | Lapp | ................... | G06F 3/04886 |
| | | | | 715/835 |
| 2020/0081577 A1* | 3/2020 | Nomura | .............. | G06F 3/04166 |
| 2020/0174589 A1* | 6/2020 | Hara | ................... | G06F 3/03545 |
| 2021/0157446 A1* | 5/2021 | Nakahara | .............. | G06F 3/0446 |

FOREIGN PATENT DOCUMENTS

JP           2021193625 A      12/2021

\* cited by examiner

*Primary Examiner* — Chun-Nan Lin
(74) *Attorney, Agent, or Firm* — Seed IP Law Group LLP

(57) ABSTRACT

Provided is a position detection circuit for detecting a position of an electronic pen and a position of a passive pointer on a touch surface disposed on a capacitive touch sensor constituted by a plurality of sensor electrodes arranged two-dimensionally, the electronic pen being configured to be capable of transmitting a pen signal, the passive pointer not transmitting any signal, the position detection circuit configured to detect a touch position indicative of the position of the passive pointer, and output the touch position if a size of a region forming the touch position is within a predetermined range, in which, if the electronic pen was in contact with the touch surface and becomes detached therefrom, the output of the touch position is temporarily inhibited.

11 Claims, 6 Drawing Sheets

POSITION DETECTION CIRCUIT, POSITION DETECTION SYSTEM, AND POSITION DETECTION METHOD IN WHICH OUTPUT OF TOUCH POSITION IS TEMPORARILY INHIBITED

BACKGROUND

Technical Field

The present disclosure relates to a position detection circuit, a position detection system, and a position detection method.

Background Art

There has been known a position detection system that detects a pen position of an electronic pen and a touch position of a passive pointer such as a user's finger on a touch surface disposed on a touch sensor. For example, Japanese Patent Laid-open No. 2021-193625 discloses a position detection system that detects, on a time-sharing basis, the pen position of the electronic pen and the touch position of the user's finger on the touch surface before outputting the detected positions to a host processor.

The position detection system disclosed in the above Japanese Patent Laid-open No. 2021-193625 determines whether or not to output the touch position to the host processor based on the size of a region forming the detected touch position. For example, in a case where the region size of the detected touch position is within a predetermined range, the system determines that the position is touched by a finger, and outputs the touch position to the host processor. In a case where the region size of the detected touch position exceeds the predetermined range, the system determines that the position is touched by a palm or the flat of the hand or the first larger than the finger and thus excludes the touch position from what is output to the host processor.

However, at the time when the electronic pen in contact with the touch surface is detached therefrom or at the time when the electronic pen approaches the touch surface, there can be a point in time at which the hand holding the electronic pen has a reduced region of contact with the touch surface depending on the user's movement. That is, the region size of the detected touch position can temporarily vary. As a result, even if the touch is made by the pen-holding hand, the touch may be determined erroneously to be made by a finger so that the touch position may be output inadvertently to the host processor.

During input by the user of a picture or a letter with the electronic pen, the user's elbow or arm may come into contact unintentionally with the touch surface. In order to inhibit the erroneous detection of such unintended touches during the input by the electronic pen, an exclusive mode may be activated to stop detecting the touches while allowing the electronic pen to be detected. However, when the exclusive mode is cancelled upon detachment of the electronic pen from the touch surface, for example, there is a possibility that the unintended touches may be erroneously detected and output to the host processor.

As described above, the existing technology has room for improvement in view of the possibility that the erroneous determination of the region size of the touch position due to the temporary size variation or the erroneous detection of touches not intended by the user may result in a rendering unexpected by the user.

BRIEF SUMMARY

It is therefore an object of the present disclosure to provide a position detection circuit, a position detection system, and a position detection method for preventing the rendering not intended by the user.

As a first embodiment of the present disclosure, there is provided a position detection circuit for detecting a position of an electronic pen and a position of a passive pointer on a touch surface disposed on a capacitive touch sensor constituted by a plurality of sensor electrodes arranged two-dimensionally, the electronic pen being configured to be capable of transmitting a pen signal, the passive pointer not transmitting any signal. The position detection circuit includes at least one processor; and at least one memory storing instructions that, when executed, by the at least one processor, cause the position detection circuit to: detect a touch position indicative of the position of the passive pointer, and output the touch position detected by the detection part if a size of a region forming the touch position is within a predetermined range. If the electronic pen was in contact with the touch surface and becomes detached therefrom, the output of the touch position is temporarily inhibited.

As a second embodiment of the present disclosure, the instructions, when executed, by the at least one processor, cause the position detection circuit to, in a case where the electronic pen was in contact with the touch surface and becomes detached therefrom, track the region which forms the touch position and of which the size is within the predetermined range. The output of the touch position is kept inhibited while the region is continuously tracked, inhibition of the output of the touch position is canceled if tracking of the region is discontinued.

As a third embodiment of the present disclosure, the instructions, when executed, by the at least one processor, cause the position detection circuit to operate in a first operation mode in which a pen position indicative of the position of the electronic pen is detected while the touch position is not detected, and if the electronic pen was in contact with the touch surface and becomes detached therefrom, switch from operation in the first operation mode to operation in a second operation mode in which the touch position and the pen position are detected on a time-sharing basis. If operation in the first operation mode switches to operation in the second operation mode, the output of the touch position is temporarily inhibited.

As a fourth embodiment of the present disclosure, the output of the touch position is temporarily inhibited either by stopping the output of the touch position or by invalidating the touch position before the output thereof.

As a fifth embodiment of the present disclosure, the instructions, when executed, by the at least one processor, cause the position detection circuit to determine whether or not the electronic pen was in contact with the touch surface and becomes detached therefrom based on a writing pressure value indicative of a pressure applied to a pen tip of the electronic pen. In response to determining that the electronic pen was in contact with the touch surface and becomes detached therefrom, the output of the touch position is temporarily inhibited.

As a sixth embodiment of the present disclosure, the output of the touch position is temporarily inhibited based on a writing pressure value indicative of a pressure applied to a pen tip of the electronic pen.

As a seventh embodiment of the present disclosure, there is provided a position detection system including an electronic pen and a position detection circuit, the electronic pen being configured to be capable of transmitting a pen signal, the position detection circuit detecting a position of the electronic pen and a position of a passive pointer on a touch surface disposed on a capacitive touch sensor constituted by a plurality of sensor electrodes arranged two-dimensionally, the passive pointer not transmitting any signal. The position detection circuit includes at least one processor, and at least one memory storing instructions that, when executed by the at least one processor, cause the position detection circuit to detect a touch position indicative of the position of the passive pointer, and output the touch position if a size of a region forming the touch position is within a predetermined range. If the electronic pen was contact with the touch surface and becomes detached therefrom, the output of the touch position detected by the detection part is temporarily inhibited.

As an eighth embodiment of the present disclosure, the instructions, when executed, by the at least one processor, cause the position detection circuit to, if where the electronic pen was in contact with the touch surface and becomes detached therefrom, track the region which forms the touch position and of which the size is within the predetermined range. The output of the touch position is kept inhibited if the region is continuously tracked, and inhibition of the output of the touch position is canceled if the tracking of the region is discontinued.

As a ninth embodiment of the present disclosure, the instructions, when executed, by the at least one processor, cause the position detection circuit to operate in a first operation mode in which a pen position indicative of the position of the electronic pen is detected while the touch position is not detected, and if the electronic pen was contact with the touch surface and becomes detached therefrom, the position detection circuit switches from operation in the first operation mode to operation in a second operation mode in which the touch position and the pen position are detected on a time-sharing basis. If the position detection circuit switches operation in from the first operation mode to operation in the second operation mode, the output of the touch position is temporarily inhibited.

As a tenth embodiment of the present disclosure, the output of the touch position is inhibited either by stopping the output of the touch position or by invalidating the touch position before the output thereof.

As an eleventh embodiment of the present disclosure, the instructions, when executed, by the at least one processor, cause the position detection circuit to determine whether or not the electronic pen was contact with the touch surface and becomes detached therefrom based on a writing pressure value indicative of a pressure applied to a pen tip of the electronic pen. In response to determining that the electronic pen was in contact with the touch surface and becomes detached therefrom, the output of the touch position is temporarily inhibited.

As a twelfth embodiment of the present disclosure, the output of the touch position is temporarily inhibited based on a writing pressure value indicative of a pressure applied to a pen tip of the electronic pen.

As a thirteenth embodiment of the present disclosure, there is provided a position detection method for detecting a position of an electronic pen and a position of a passive pointer on a touch surface disposed on a capacitive touch sensor constituted by a plurality of sensor electrodes arranged two-dimensionally, the electronic pen being configured to be capable of transmitting a pen signal, the passive pointer not transmitting any signal. The position detection method includes detecting a touch position indicative of the position of the passive pointer and outputting the touch position detected by the detecting if a size of a region forming the touch position detected in the detecting is within a predetermined range, and if the electronic pen was in contact with the touch surface and becomes detached therefrom, the outputting is temporarily inhibited.

According to the present disclosure, it is thus possible to inhibit the rendering not intended by the user.

DETAILED DESCRIPTION OF THE PREFERRED EMBODIMENTS

A position detection system as one preferred embodiment of the present disclosure (referred to as "the present embodiment" hereunder) is described below with reference to the accompanying drawings. For the purpose of easy understanding, throughout the appended drawings and the description that follows, like reference signs designate like constituent elements with substantially similar functions as much as possible, and the explanations of such elements will be omitted where they are redundant.

<Overall Configuration>

Figure 1:
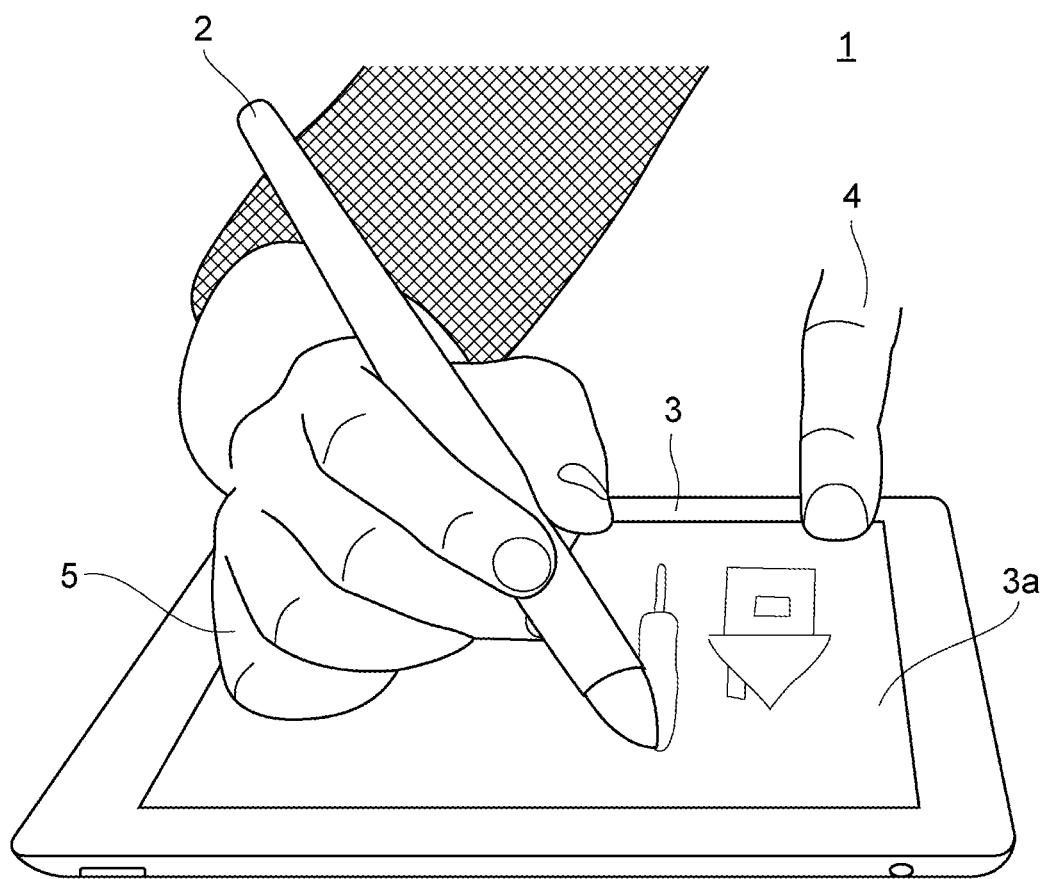
FIG. 1 is a diagram depicting an overall configuration of a position detection system as one embodiment of the present disclosure and a typical manner in which it is used.

FIG. 1 is a diagram depicting an overall configuration of a position detection system 1 as one embodiment of the present disclosure and a typical manner in which it is used. As depicted in FIG. 1, the position detection system 1 of the present embodiment includes an electronic pen 2 and a tablet terminal 3.

The electronic pen 2 operates by the active electrostatic method and is also known as a "stylus." The electronic pen 2 is configured to be capable of transmitting and receiving signals to and from the tablet terminal 3. In the ensuing description, the signal transmitted from the tablet terminal 3 to the electronic pen 2 will be referred to as the uplink signal, and the signal sent from the electronic pen 2 to the tablet terminal 3 (i.e., pen signal) will be referred to as the downlink signal.

The electronic pen 2 is tipped with a pen electrode. A capacitance formed between the pen electrode on one hand and a touch sensor 18 (see FIG. 2) inside a touch surface 3a of the tablet terminal 3 on the other hand allows the electronic pen 2 to receive the uplink signal and transmit the downlink signal. Incidentally, either the same pen electrode or different pen electrodes may be used to receive the uplink signal and transmit the downlink signal.

The electronic pen 2 also has functional parts such as a writing pressure detection part, a side-switch state detection part, a storage part, and a power supply part. The writing pressure detection part detects a pressure applied to a pen tip of the electronic pen 2 as a writing pressure. The side-switch state detection part detects an on-off state of a side-switch disposed on the side surface of the electronic pen 2. The storage part stores a unique identifier (ID) assigned to the electronic pen 2 in advance. The power supply part supplies the operating power to the electronic pen 2. The electronic pen 2 is configured to be capable of controlling these functional parts.

The tablet terminal 3 is an electronic device that has the touch surface 3a including a touch panel display, for example. The tablet terminal 3 is configured to be capable of detecting the pen position of the electronic pen 2 and the touch position of a user's finger 4 on the touch surface 3a, the finger 4 being a passive pointer not transmitting any signal. The position detection system 1 may include a smartphone or a personal computer, for example, in place of the tablet terminal 3 as the electronic device. Instead of the finger 4, the passive pointer may be a ruler or an auxiliary device such as a passive pen not transmitting signals as with the finger 4.

The user holds the electronic pen 2 with one hand and moves it while pressing the pen tip onto the touch surface 3a of the tablet terminal 3. This allows the user to write pictures and letters into the tablet terminal 3. The user may also bring the finger 4 into contact with the touch surface 3a and move the finger 4 thereover. This enables the user also to write pictures and letters into the tablet terminal 3 or to perform desired operations including a pinch-out motion.

Figure 2:
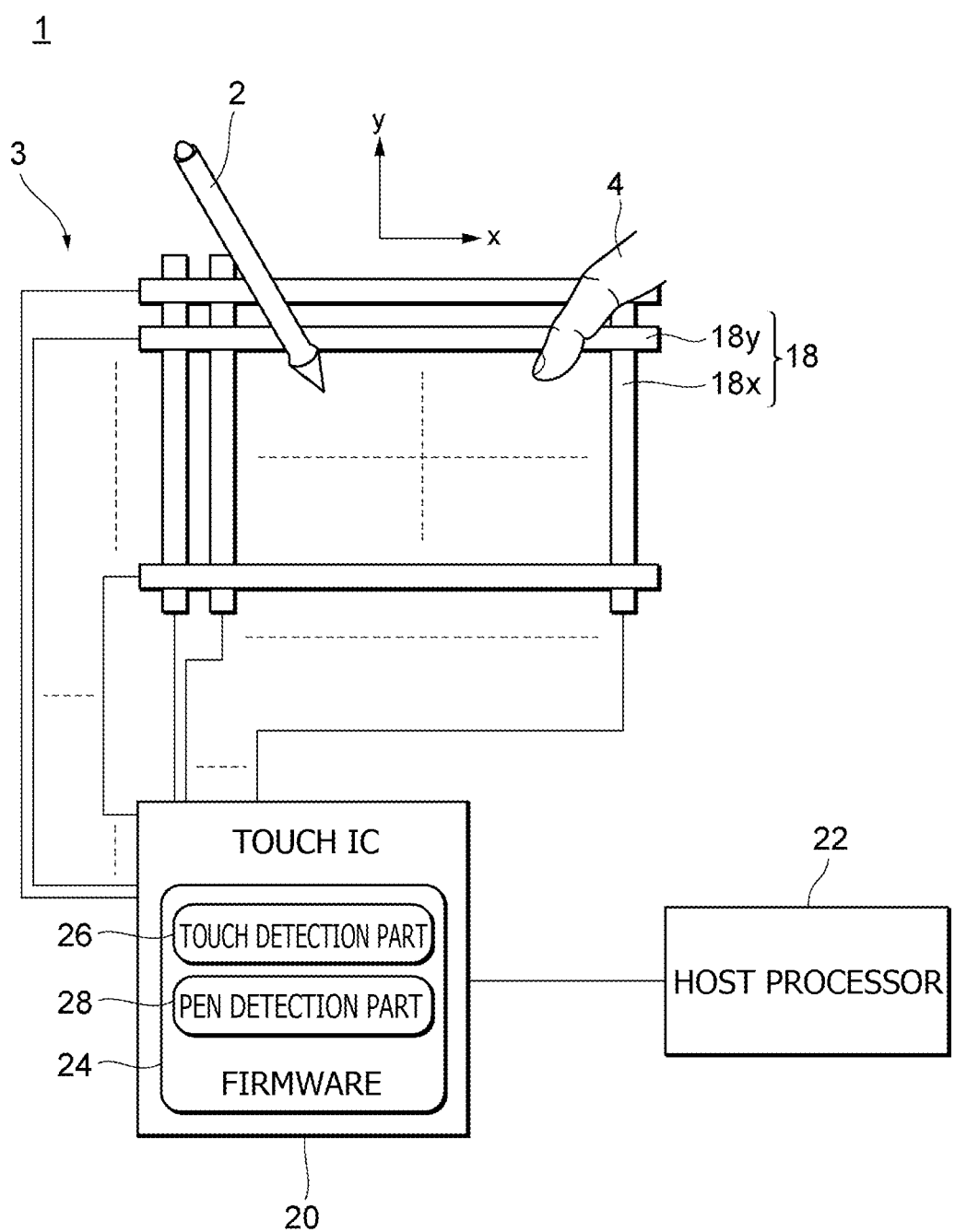
FIG. 2 is a diagram depicting a general configuration of a tablet terminal in FIG. 1.

FIG. 2 is a diagram depicting a general configuration of the tablet terminal 3 in FIG. 1. As depicted in FIG. 2, the tablet terminal 3 includes a touch sensor 18, a touch IC 20 as a position detection circuit, and a host processor 22. In FIG. 2, the touch surface 3a disposed on the touch sensor 18 is not depicted.

The touch sensor 18 is a capacitive touch sensor that has multiple sensor electrodes arranged two-dimensionally inside the touch surface 3a. The touch sensor 18 includes multiple sensor electrodes 18x for detecting positions on the X axis and multiple sensor electrodes 18y for detecting positions on the Y axis. The x-direction and y-direction in FIG. 2 correspond to the X and Y axes of an orthogonal coordinate system defined on the touch surface 3a.

The belt-shaped sensor electrodes 18x extend in the y-direction and are spaced at equal intervals in the x-direction. The belt-shaped sensor electrodes 18y extend in the x-direction and are spaced at equal intervals in the y-direction. Alternatively, instead of being a mutual capacitance sensor as described above, the touch sensor 18 may be a self-capacitance sensor having block electrodes arranged in a two-dimensional grid pattern.

The touch IC 20 has a memory (read-only memory (ROM) and random-access memory (RAM)) inside. The touch IC 20 is an integrated circuit configured to be capable of executing firmware 24 stored in the memory. The touch IC 20 is connected with the multiple sensor electrodes 18x and 18y constituting the touch sensor 18. The firmware 24 causes the touch IC to perform a scan process of reading and processing detection signals successively output from the individual sensor electrodes 18x and 18y. The firmware 24 is configured to be capable of implementing a touch detection function and a pen detection function, the touch detection function involving detection of the user's finger 4 by performing the scan process, the pen detection function involving detection of the electronic pen 2 by carrying out the scan process as well. In other words, the touch IC 20 includes a touch detection part 26 performing the touch detection function and a pen detection part 28 executing the pen detection function. In one or more implementations, the touch IC 20 includes at least one processor that executes the firmware 24 stored in the memory, which causes the IC 20 to perform the functions of the touch detection part 26 and the pen detection part 28 described herein. The touch IC 20 outputs data acquired by the touch detection part 26 or by the pen detection part 28 to the host processor 22.

The firmware 24 also causes the touch IC 20 to function as an operation control part that switches operation modes of the position detection system 1. The operation modes include, for example, an exclusive mode (first operation mode) in which the pen position is detected while the touch position is not detected, and a time-sharing mode (second operation mode) in which the touch position of the finger 4 and the pen position of the electronic pen 2 are detected on a time-sharing basis. In a normal scan state, the firmware 24 sets the operation mode to the time-sharing mode. In a case where the electronic pen 2 is detected, for example, the firmware 24 switches the operation mode from the time-sharing mode to the exclusive mode. In a case where the pen tip of the electronic pen 2 is detached from the touch surface 3a in the exclusive mode, for example, the firmware 24 switches from the exclusive mode to the time-sharing mode.

The host processor 22 includes a central processing unit (CPU) or a graphics processing unit (GPU). The host processor 22 reads programs from the memory, not depicted, and carries out the retrieved programs to perform processes of generating stroke data using the data from the touch IC 20, for example, and of displaying what is thus rendered on the display.

<Functional Configuration of the Touch IC 20>

Figure 3:
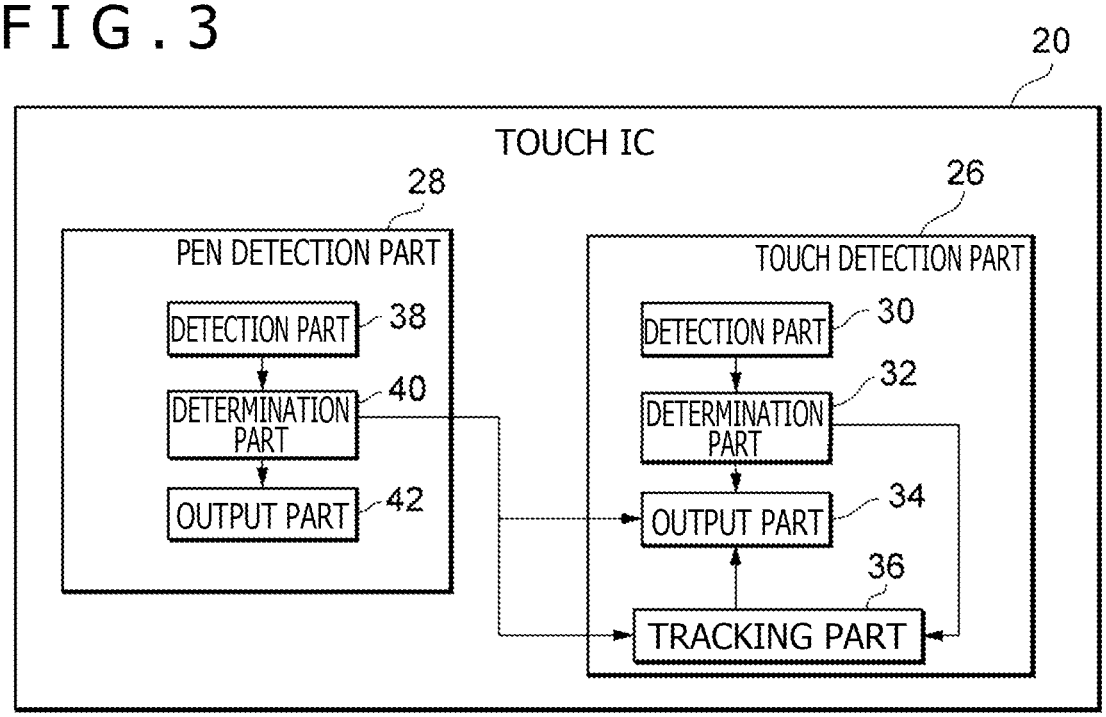
FIG. 3 is a functional block diagram depicting a configuration of the functions included in a touch integrated circuit (IC) in in FIG. 2.

FIG. 3 is a functional block diagram depicting a configuration of the functions included in the touch IC 20 in FIG. 2.

<Touch Detection Part 26>

As depicted in FIG. 3, the touch detection part 26 in the touch IC 20 includes a detection part 30, a determination part 32, an output part 34, and a tracking part 36.

The detection part 30 detects the touch position of the finger 4 by detecting capacitive coupling generated between the tip of the finger 4 on one hand and the sensor electrodes 18x and 18y in the touch sensor 18 on the other hand. Specifically, the detection part 30 transmits a touch detection signal to each sensor electrode 18y and has the touch detection signal received by each sensor electrode 18x. Based on the result of receiving the touch detection signal, the detection part 30 prepares a heat map indicative of the detection level at each two-dimensional position on the touch sensor 18. Each two-dimensional position on the touch sensor 18 is a point at which a given sensor electrode 18x and a given sensor electrode 18y cross each other (the point will be referred to as "the cross point" hereunder). The detection level at each two-dimensional position reflects changes in capacitance generated at the cross point.

The detection part 30 detects a region of which the detection levels in the heat map are equal to or higher than a threshold value, i.e., a region of which the changes in capacitance generated at the cross points are equal to or higher than the threshold value, as the region of the touch position of the finger 4. The region of the touch position may be simply referred to as "the touch region" hereunder. In the touch region, the detection part 30 detects the center position, or the position at which the change in capacitance is largest, for example, as the touch position of the finger 4, and calculates the coordinates of the touch position. In a case where there exist, at predetermined distances apart, multiple regions of which the detection levels in the heat map are equal to or higher than the threshold value, each of the regions may be detected as the touch position of the finger 4. The detection part 30 outputs, to the determination part 32, the generated heat map and the calculated coordinates of the position of the finger 4.

Based on the heat map prepared by the detection part 30, the determination part 32 performs a determination process regarding the size of the touch region.

Figure 4:
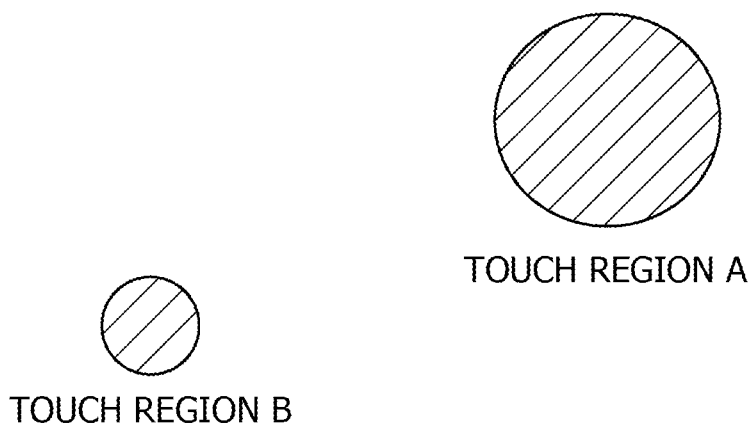
FIG. 4 is a diagram explaining a determination process regarding the sizes of touch regions.

FIG. 4 is a diagram explaining the determination process regarding the sizes of touch regions. FIG. 4 indicates that two touch regions A and B are detected by the detection part 30. It is assumed that, of these regions, the touch region B has an area that is within a first range and the touch region A has an area that falls within a second range. The first range is a predetermined range indicated by upper and lower limits for determination of a small region, and the second range is a predetermined range defined by upper and lower limits for determination of a large region. For example, the first range is given an area 1 to 5 mm in diameter, and the second range is given an area 10 to 30 mm in diameter, the area of the latter being larger than that of the first range. The determination part 32 determines the touch region B to be "small region" and the touch region A to be "large region." Also, the determination part 32 determines that the touch region B as a small region is a touch region formed by the finger 4 (finger region) and that the touch region A as a large region is a touch region produced by a palm or the flat of the hand or the first (palm region) larger than the finger 4.

Further, instead of or in addition to determining the area of the touch region, the determination part 32 may determine whether the touch region is a small region (finger region) or a large region (palm region) using the number of cross points making up the touch region. For example, if the number of cross points constituting the touch region is within the first range, the determination part 32 determines that the touch region is a small region (finger region), and if the number of cross points making up the touch region is within the second range, i.e., larger than the number of cross points of the first range, the determination part 32 determines that the touch region is a large region (palm region). The determination part 32 outputs the result of determination of the touch region size to the output part 34.

Figure 5:
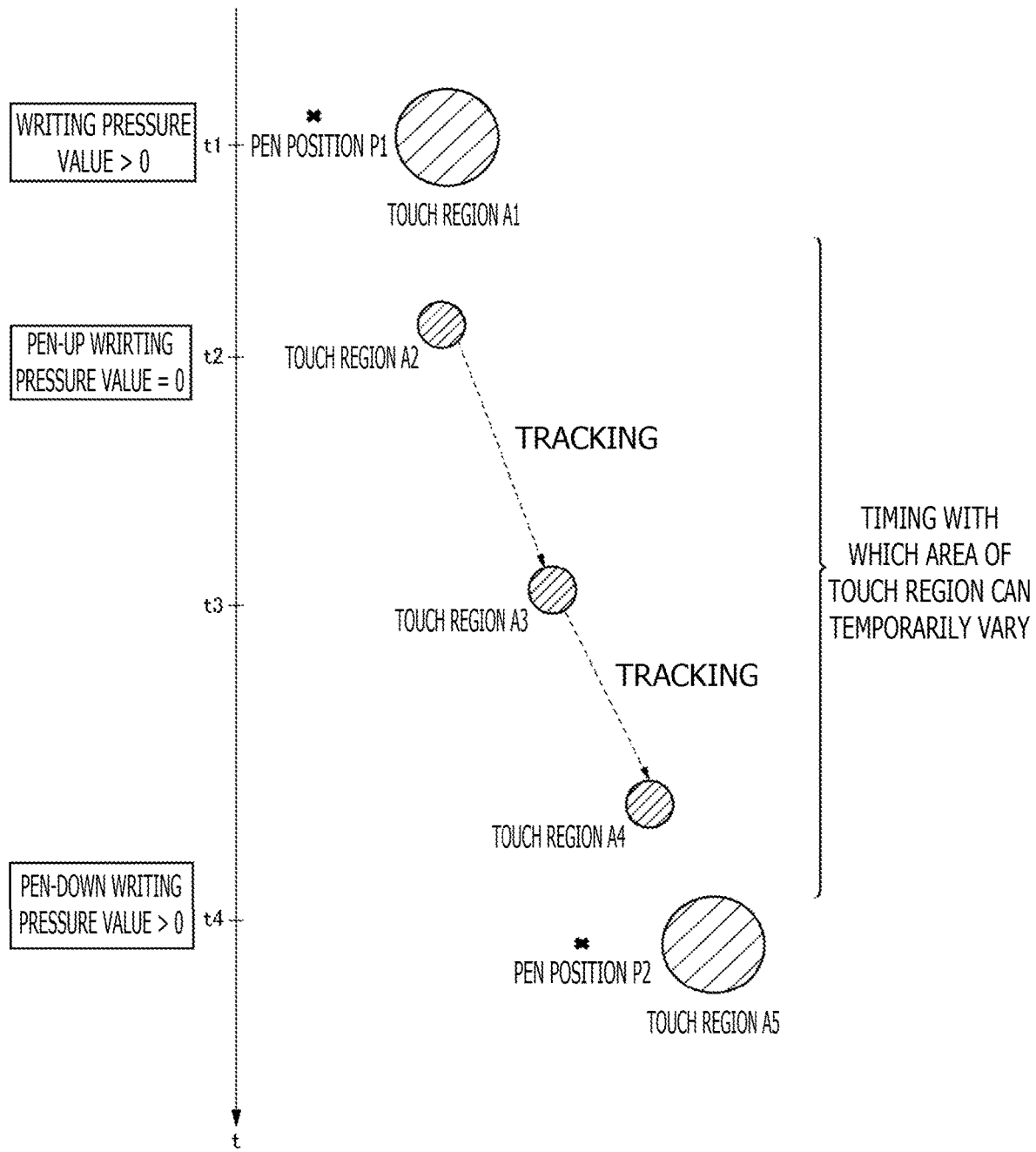
FIG. 5 is a diagram depicting changes over time in the sizes of the touch regions.

Explained below are the changes over time in the touch region size. FIG. 5 is a diagram depicting changes over time in the sizes of the touch regions.

At time t1 in chronological order in FIG. 5, the user is assumed to hold the electronic 2 with one hand and keep the pen tip of the electronic pen 2 in contact with the touch surface 3a of the tablet terminal 3 (writing pressure >0). At this time, if the user's pen-holding hand 5 (see FIG. 1) holding the electronic pen 2 is in contact with the touch surface 3a, the contact causes detection of a touch region A1 (large region) of which the size is within the second range on the right side of a pen position P1 of the electronic pen 2.

At time t2 following the state above, a pen-up movement (writing pressure=0) is assumed to be detected, which indicates that the pen tip of the electronic pen 2 in contact with the touch surface 3a is detached therefrom. At this time, depending on the user's movement, there may be a point in time at which the size of the contact region between the pen-holding hand 5 and the touch surface 3a is reduced so that a touch region A2 of which the size is within the first range (i.e., small region) may be detected. When the electronic pen 2 is moved with its pen tip slightly detached from the touch surface 3a, touch regions A3 and A4 of which the sizes are each within the first range (small regions) may also be detected in like manner.

Then, at time t4, a pen-down movement (writing pressure >0) is assumed to be determined, which indicates that the pen tip of the electronic pen is placed on the touch surface 3a at a pen position P2 following movement from the pen position P1. At this time, when the contact of the pen-holding hand 5 with the touch surface 3a is stabilized, a touch region A5 (large region) having a size within the second range is detected.

As described above, at the time of a pen-up or pen-down movement, the size of the touch region of the pen-holding hand 5 in contact with the touch surface 3a varies temporarily. With the present embodiment, in consideration of the temporary variation in the touch region size, the output of the touch position to the host processor 22 is temporarily inhibited when the electronic pen 2 in contact with the touch surface 3a is detached therefrom. The case in which the electronic pen 2 in contact with the touch surface 3a is separated therefrom signifies that a determination part 40 in the pen detection part 28 recognizes a pen-up movement based on the writing pressure value indicative of the pressure applied to the pen tip of the electronic pen 2. That is, the present embodiment temporarily inhibits the output of the touch position to the host processor 22 based on the writing pressure value indicative of the pressure applied to the pen tip of the electronic pen 2. The cases where the electronic pen 2 in contact with the touch surface 3a is detached therefrom may include not only one in which the electronic pen 2 is completely separated from the touch surface 3a but also one where the electronic pen 2 is about to be detached from the touch surface 3a. In the ensuing description, the state in which the output of the touch position to the host processor 22 is inhibited will be referred to as "the touch output inhibited state," which will be discussed below in specific terms.

In the touch output inhibited state, the determination part 32 performs the determination process in a manner different from in the normal scan state. For example, in the touch output inhibited state, the determination part 32 determines the size of the touch region according to determination criteria of which the settings are changed so as to make it more difficult to determine that the touch region is a small region (finger region) compared to the normal scan state, before outputting the result of the determination to the output part 34. That is, the settings of the first and the second ranges are changed to form the criteria by which the determination part 32 determines the size of the touch region. For example, the first range in the touch output inhibited state is set to be smaller compared to the normal scan state. Alternatively, the second range in the touch output inhibited state may be set to include both the first range and the second range in the normal scan state. Given these settings, the touch region is determined to be a large region (palm region) regardless of the region being within the first or the second range in the normal scan state.

As another alternative, without the settings of the determination criteria being changed as described above, a large region (palm region) may substitute for all results of the determination by the determination part 32 in the touch output inhibited state. That is, even if the actual touch region size is determined to be a small region (finger region), the determination part 32 may substitute a large region (palm region) for the result of the determination before outputting the result of the determination to the output part 34.

In the touch output inhibited state, the determination part 32 also determines the size of the touch region to be tracked by the tracking part 36. The determination part 32 may preferably use, as the criteria for determining the size of the touch region to be tracked, not the determination criteria changed as described above but the determination criteria in the normal scan state. The determination part 32 outputs the result of the determination to the tracking part 36.

Returning to FIG. 3, the output part 34 outputs the coordinates of the touch position to the host processor 22 based on the result of the determination of the touch region area by the determination part 32. Specifically, in a case where the touch region is determined to be a small region (finger region), i.e., where the touch region is within the first range, the output part 34 outputs the touch position detected by the detection part 30 to the host processor 22. Also, the output part 34 may output the heat map generated by the detection part 30 and the result of the determination by the determination part 32 to the host processor 22.

In a case where the electronic pen 2 in contact with the touch surface 3a is detached therefrom, the output part 34 temporarily inhibits the output of the touch position detected by the detection part 30 to the host processor 22. With the present embodiment, when the operation mode is switched from the exclusive mode to the time-sharing mode as a result of the electronic pen 2 being detached from the touch surface 3a, the output part 34 inhibits the output of the touch position detected by the detection part 30 to the host processor 22.

That the output of the touch position is inhibited means that it is made more difficult to output the touch position compared to the normal scan state. In the touch output inhibited state, as described above, it is more difficult to determine the touch region to be a small region (finger region) compared to the normal scan state due to the setting changes made by the determination part 32 in the criteria for determining the touch region size or because of all results of the determination of the touch region size being replaced by the determination part 32. This causes the output part 34 to inhibit the output of the touch position.

For example, when the determination part 32 determines that the touch region is a large region (palm region) or substitutes a large region for any result of the determination in the touch output inhibited state, the output part 34 stops outputting the touch position or invalidates the touch position before output. Stopping the output means to stop the output of the touch position to the host processor 22 (i.e., to exclude the touch position output from whatever is output thereto). Invalidating before output means to invalidate the coordinates of the touch position to prevent rendering by the host processor 22 before the output of the touch position to the latter. As an example of invalidation, both the touch position and an invalidation flag may be output to the host processor 22. In this manner, by stopping or invalidating the output, the output part 34 prevents the host processor 22 from performing the process of making renderings based on the detected touch position.

Inhibiting the output temporarily means to inhibit the output until a predetermined cancellation condition is met. For example, the output part 34 continuously inhibits the output of the touch position until the touch region tracked by the tracking part 36 is lost (disappears), which meets the cancellation condition. In a case where the tracking part 36 keeps tracking the touch region, the output part 34 inhibits the output of the touch position continuously. In a case where the tracking part 36 discontinues tracking the touch region, the output part 34 cancels the inhibited output of the touch position.

When the electronic pen 2 in contact with the touch surface 3a is detached therefrom, the tracking part 36 tracks the touch position region which is detected by the detection part 30 and of which the size is within the first range. For example, the tracking part 36 tracks the touch region determined to be a small region (finger region) by the determination part 32. Tracking the touch region means to trail the touch region.

For example, at the time when the output part 34 starts inhibiting the output of the touch position, the tracking part 36 starts tracking the touch region determined to be a small region (finger region) by the determination part 32. When starting the tracking, the tracking part 36 provides a predetermined tracking ID (=1) to the touch region about to be tracked. As long as the detection level of the currently tracked touch region (tracking ID=1) is equal to or higher than a predetermined threshold value, the tracking part 36 continuously tracks the touch region. When the detection level of the currently tracked touch region (tracking ID=1) becomes equal to or lower than the threshold value, the tracking part 36 determines that the touch region to be tracked is lost and terminates the tracking. That is, the tracking part 36 tracks the touch region being touched uninterruptedly until the user's touch is detached from the touch surface 3a, at which time the tracking part 36 terminates the tracking. For example, the tracking part 36 tracks a series of touch regions A2 to A4 from a pen-up point to a pen-down point as depicted in FIG. 5.

<Pen Detection Part 28>

The pen detection part 28 in the touch IC 20 includes a detection part 38, a determination part 40, and an output part 42.

The detection part 38 transmits a signal to the electronic pen 2 and receives a signal transmitted from the electronic pen 2 in response to the signal sent thereto earlier. This allows the detection part 38 to detect the pen position of the electronic pen 2. Specifically, the detection part 38 performs processes of generating an uplink signal, of inputting the generated signal to the sensor electrodes 18x and 18y, and of causing the electrodes to transmit the uplink signal to the electronic pen 2. The uplink signal is a signal that synchronizes the electronic pen 2 with the tablet terminal 3 while transmitting, to the electronic pen 2, a command designating the content of the data to be sent to the electronic pen 2.

The detection part 38 receives a pen signal transmitted from the electronic pen 2 in response to the uplink signal received by the electronic pen 2. The pen signal includes, in the ensuing order, an unmodulated burst signal and a data signal modulated by various kinds of data acquired internally by the electronic pen 2. The various kinds of data acquired internally by the electronic pen 2 is acquired by the various functional parts of the electronic pen 2. The various kinds of data include, for example, data indicative of the writing pressure (writing pressure value) detected by the writing pressure detection part, data indicative of a side-switch on/off state (switch data) acquired by the side-switch state detection part, and a unique pen ID stored in the storage part.

The detection part 38 performs the scan process based on the determination of whether or not a global scan is to be carried out. If it is determined that the global scan is to be conducted, the detection part 38 performs the global scan. That is, while the electronic pen 2 is transmitting the pen signal, the detection part 38 scans all sensor electrodes 18x and 18y constituting the touch sensor 18. If it is determined that the global scan is not to be carried out, the detection part 38 performs a sector scan. That is, while the electronic pen 2 is transmitting a burst signal, the detection part 38 scans, from among the multiple sensor electrodes 18x and 18y making up the touch sensor 18, solely a predetermined number of the sensor electrodes 18x and 18y close to the immediately preceding pen coordinates.

The detection part 38 detects the pen signal as a result of the global scan or the sector scan. In a case where the pen signal is not detected, the detection part 38 outputs pen data indicative of non-detection of the pen to the output part 42. In a case where the pen signal is detected, the detection part 38 calculates the pen coordinates based on the detection levels of the pen signal in the sensor electrodes 18x and 18y. The detection part 38 then outputs the pen data indicative of the calculated pen coordinates to the output part 42. Also, the detection part 38 receives various kinds of data from the electronic pen 2 by receiving and demodulating the data signal using the sensor electrodes 18x and 18y closest to the pen coordinates calculated as a result of the sector scan. The detection part 38 outputs the various kinds of data to the determination part 40 and to the output part 42.

The determination part 40 determines pen state information based on the various kinds of data transmitted from the electronic pen 2. The pen state information is information indicative of a pen-down state, a pen-move state, or a pen-up state. The pen-down state indicates that the pen tip of the electronic pen 2 is placed on the touch surface 3a as described above, i.e., that the electronic pen 2 is in contact with the touch surface 3a. The pen-move state indicates that the electronic pen 2 in contact with the touch surface 3a remains in contact therewith. The pen-up state indicates that the electronic pen 2 in contact with the touch surface 3a is detached therefrom as described above. The determination part 40 determines the pen state information based on whether the writing pressure value included in the various kinds of data sent from the electronic pen 2 is equal to or higher than a threshold value. The pen state information is used by the host processor 22 to recognize the beginning and end of a stroke.

In a case where the writing pressure value changes from a value larger than zero to zero, the determination part 40 recognizes a pen-up state. The determination part 40 may also recognize the pen-up state not only when the writing pressure value is changed to zero but also when the writing pressure value is changed to a value equal to or smaller than a threshold value close to zero. In a case where the writing pressure value is changed to a value equal to or smaller than a threshold value close to zero in this manner, the electronic pen 2 may be considered to be detached from the touch surface 3a when the electronic pen 2 is about to be detached from the touch surface 3a but not completely separated therefrom. In a case where the writing pressure value is changed from zero to a value larger than zero, the determination part 40 recognizes a pen-down state. When the writing pressure value remains larger than zero, the determination part 40 recognizes a pen-move state. The determination part 40 outputs the result of the determination of the pen state information to the output part 42 and to the output part 34 and tracking part 36 in the touch detection part 26.

In a case where the detection part 38 does not detect the pen signal, the output part 42 transmits the pen data indicative of non-detection of the pen to the host processor 22. In a case where the detection part 38 detects the pen signal, the output part 42 transmits the pen data indicative of the pen coordinates derived by the detection part 38 to the host processor 22. The output part 42 may also transmit, to the host processor 22, the various kinds of data sent from the electronic pen 2 as well as the pen state information determined by the determination part 40.

<Operations of the Position Detection System 1>

Figure 6:
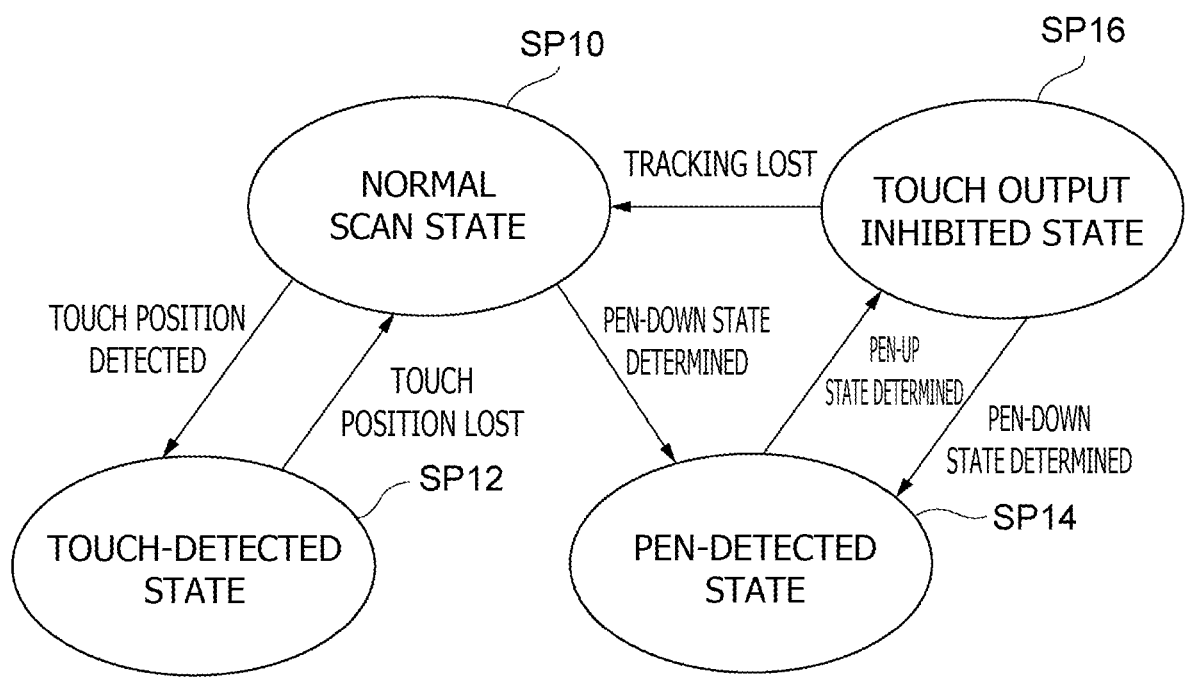
FIG. 6 is a state transition diagram schematically depicting a flow of operations of the position detection system.

How the position detection system 1 operates is explained below with reference to FIG. 6. FIG. 6 is a state transition diagram schematically depicting a flow of operations of the position detection system 1.

(SP10: Normal Scan State)

As depicted in FIG. 6, in a case where the normal scan state is the initial state, the position detection system 1 operates in the time-sharing mode in which touch detection and pen detection are carried out alternately on a time-sharing basis. Here, the frequencies at which the touch detection and the pen detection are performed are set to a predetermined ratio in advance. The ratio of the frequencies at which the pen detection and the touch detection are carried out in one repetition period may be any of 1:1, 1:n, n:1, and n:m (where n and m are integers). In a case where the touch position of the finger 4 is detected by the detection part 30 at the time when the touch detection is performed at SP10, processing is transferred to a touch-detected state (SP12). Also, if a pen-down movement is recognized by the determination part 40 regarding the electronic pen 2 detected by the detection part 38 at the time when the pen detection is carried out at SP10, processing is transferred to a pen-detected state (SP14).

(SP12: Touch-Detected State)

In the touch-detected state, the touch detection part 26 performs normal touch detection. Specifically, the determination part 32 determines the region size of the detected touch position. The touch position determined to be a small region (finger region) is output, by the output part 34, to the host processor 22. When the finger 4 is detached from the touch surface 3a so that the touch position detected by the detection part 30 is lost, processing is returned to the normal scan state of SP10.

(SP14: Pen-Detected State)

In the pen-detected state, the pen detection part 28 performs normal pen detection. Specifically, the detected pen state is output by the output part 42 to the host processor 22. In the pen-detected state, the position detection system 1 may operate in the exclusive mode in which the pen position alone is detected and the touch position is not detected. Also, in the pen-detected state, the determination part 40 determines the pen state information. In a case where a pen-up state is recognized by the determination, processing is transferred to the touch output inhibited state (SP16).

(SP16: Touch Output Inhibited State)

In the touch output inhibited state, the position detection system 1 operates in the time-sharing mode in which the touch detection and the pen detection are carried out alternately on a time-sharing basis as in the normal scan state. In this mode, even when the touch position is detected, the output of the detected touch position is inhibited. The flow of this processing is described below in detail with reference to the flowchart of FIG. 7.

Figure 7:
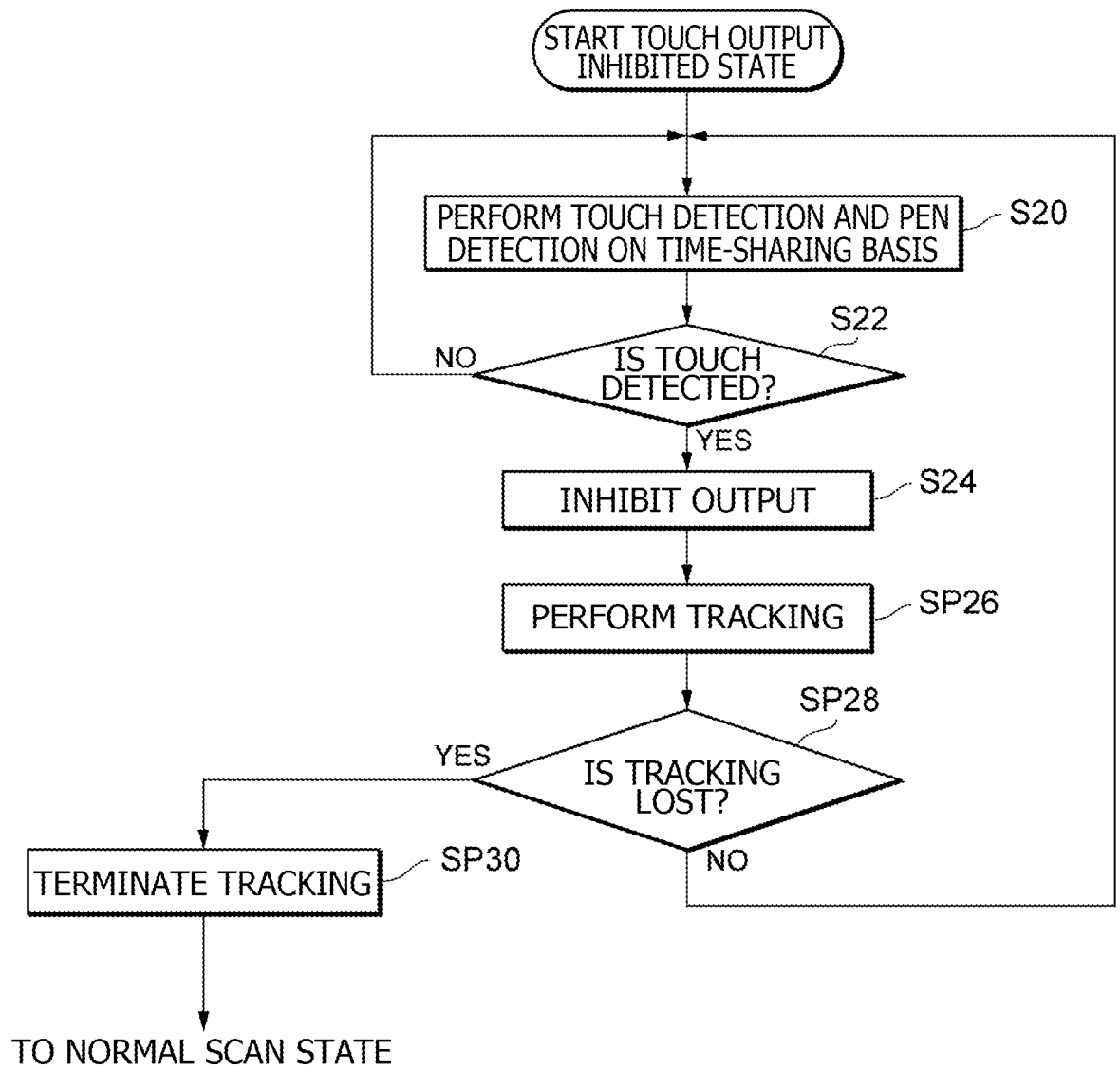
FIG. 7 is a flowchart depicting a typical flow of processing in a touch output inhibited state.

FIG. 7 is a flowchart depicting a typical flow of the processing in the touch output inhibited state. The processing steps described below may be changed in sequence as needed.

(SP20)

In the touch output inhibited state, as in the normal scan state, the touch detection and the pen detection are carried out alternately on a time-sharing basis. At the time when the pen detection is performed at SP20, a pen-down movement may be recognized by the determination part 40 regarding the electronic pen 2 detected by the detection part 38. At this point, processing is returned to the pen-detected state of SP14. When the touch detection is carried out at SP20, processing is transferred to SP22.

(SP22)

The detection part 30 in the touch detection part 26 determines whether or not the touch position is detected. When the result of the determination is positive, processing is transferred to SP24. If the result of the determination is negative, processing is returned to SP20.

(SP24)

The output part 34 in the touch detection part 26 inhibits the output of the detected touch position either by changing the settings of the criteria by which the determination part 32 determines the size of the touch region or by making a substitution for the result of the touch region size determined by the determination part 32. For example, with the touch region determined to be a large region (palm region) or with a large region substituting for the result of the determination of the touch region size, the output part 34 stops outputting the touch position to the host processor 22 or invalidates the touch position before output to the host processor 22. Processing is then transferred to SP26.

(SP26)

The tracking part 36 in the touch detection part 26 tracks the touch region of the touch position determined to be detected in SP22. For example, the determination part 32 in the touch detection part 26 determines the region of the detected touch position. The tracking part 36 provides a tracking ID (=1) to the touch region determined to be a small region (finger region) before tracking the region. Processing is then transferred to SP28.

(SP28)

The tracking part 36 determines whether or not the touch region provided with the tracking ID (=1) is lost. When the result of the determination is positive, processing is transferred to SP30. If the result of the determination is negative, processing is returned to SP20.

(SP30)

The tracking part 36 terminates the tracking. With the touch output inhibited state cancelled, processing is returned to the normal scan state of SP10.

Advantageous Effects

As described above, the position detection system 1 of the present embodiment includes the electronic pen 2 configured to be capable of transmitting the pen signal, and the touch IC 20 for detecting those positions over the touch surface 3a of the touch sensor 18 which are touched by the electronic pen 2 and by the finger 4 using the capacitive touch sensor 18 with the multiple sensor electrodes 18x and 18y arranged two-dimensionally therein. The touch IC 20 includes the detection part 30 that detects the touch position of the finger 4, and the output part 34 that outputs the touch position detected by the detection part 30 when the region size of the touch position detected by the detection part 30 is within the first range (predetermined range). In a case where the electronic pen 2 in contact with the touch surface 3a is detached therefrom, the output part 34 temporarily inhibits the output of the touch position detected by the detection part 30.

The position detection method of the present embodiment involves using the touch sensor 18 to detect those positions on the touch surface 3a which are touched by the electronic pen 2 and by the finger 4. The position detection method includes detecting the touch position of the finger 4 (SP10), and outputting the touch position detected by the detecting when the region size of the touch position detected by the detecting is within the first range (SP12). The outputting involves temporarily inhibiting the output of the touch position detected by the detecting when the electronic pen 2 in contact with the touch surface 3a is detached therefrom (SP16).

Here, as described above with reference to FIG. 5, there may be a case in which the size of the touch region touched by the pen-holding hand 5 on the touch surface 3a varies temporarily upon pen-up or pen-down movement. In such a case, according to the existing technology, the touch regions A2 to A4, which are a small region each, can be determined erroneously to be finger regions even if they are touched by the pen-holding hand 5, and there is a possibility that the touch positions may be output to the host processor 22. During input by the user of a picture or a letter with the electronic pen 2, the user's elbow or arm can come into contact with the touch surface 3a with no intention of input. At the time of a pen-up movement, there is a possibility that the position touched by the elbow or arm with no intention of input may be detected and output to the host processor 22.

In contrast, according to the position detection system 1, the touch IC 20, and the position detection method of the present embodiment, the output of the detected touch position is temporarily inhibited at the time of a pen-up movement in which the electronic pen 2 is detached from the touch surface 3a. As a result, even if the size of the touch region is temporarily varied or a touch is made by the user with no intention of input at the time of the pen-up movement, the output of the touch position touched by a conductor different from the finger 4 (e.g., by the pen-holding hand 5, an elbow, or an arm) can be inhibited from being made to the host processor 22. This prevents execution of rendering not intended by the user.

The present embodiment further includes the tracking part 36 that tracks, with the electronic pen 2 detached from the touch surface 3a, the region which forms the touch position detected by the detection part 30 and of which the size is within the first range. When the tracking part 36 keeps tracking the region, the output part 34 continuously inhibits the output of the touch position. When the tracking part 36 discontinues tracking the region, the output part 34 cancels the inhibited output of the touch position.

This configuration makes it possible to inhibit the output of the touch position only when the touch not intended by the user for input is continuously detected. Specifically, in a case where the touch region is continuously tracked at the time of a pen-up movement, there is a high possibility that the touch not intended by the user for input is detected continuously. The output of the touch position is therefore inhibited continuously. This can suitably inhibit the rendering not intended by the user. On the other hand, in a case where the tracking is discontinued, there is a low possibility that the touch not intended by the user for input is continuously detected. In this case, the inhibited output of the touch position is cancelled. Consequently, if there is a low possibility that the touch not intended by the user for input is being detected, the touch position can be normally output to the host processor 22 for rendering as intended by the user.

The touch IC 20 of the present embodiment further includes the firmware 24 that causes the touch IC 20 to act as an operation control part that switches to the time-sharing mode (second operation mode) in which the touch position and the pen position are detected on a time-sharing basis, in a case where the electronic pen 2 in contact with the touch surface 3a is detached therefrom in the exclusive mode (first operation mode) in which the pen position of the electronic pen 2 is detected but the touch position is not detected. When the firmware 24 causes the touch IC 20 to switch from the exclusive mode to the time-sharing mode, the output part 34 temporarily inhibits the output of the touch position detected by the detection part 30.

The exclusive mode is an operation mode in which the touch detection is stopped based on the idea that a user using the electronic pen 2 will not carry out any touch intended for input. There is therefore a high possibility that the touch position detected upon switching from the exclusive mode to the time-sharing mode is not intended by the user for input. Consequently, temporarily inhibiting the output of the touch position at such timing suitably prevents any rendering not intended by the user.

In the present embodiment, the output part 34 inhibits the output of the touch position either by stopping the output of the touch position or by invalidating the touch position before output.

This configuration thus makes it possible to inhibit any rendering not intended by the user either by stopping the output of the touch position or by invalidating the touch position before the touch position is output.

The present embodiment further includes the determination part 40 that determines whether or not the electronic pen 2 in contact with the touch surface 3a is detached therefrom based on the writing pressure value indicative of the pressure applied to the pen tip of the electronic pen 2. In a case where the result of the determination by the determination part 40 is positive, the output part 34 temporarily inhibits the output of the touch position.

This configuration makes it possible suitably to determine whether the electronic pen 2 is detached from the touch surface 3a based on the writing pressure value, thereby setting appropriate timing for temporarily inhibiting the output of the touch position.

Also in the present embodiment, the output part 34 temporarily inhibits the output of the touch position based on the writing pressure value indicative of the pressure applied to the pen tip of the electronic pen 2.

This configuration makes it possible, when the electronic pen 2 is about to be detached from the touch surface 3a, for example, to consider that the electronic pen 2 is detected from the touch surface 3a and proceed to temporarily inhibit the output of the touch position.

<Variations>

The present disclosure is not limited to the above-described embodiment. The present embodiment above may be appropriately changed in design by those skilled in the art, and such variations also fall within the scope of this disclosure as long as they have what characterizes the disclosure. The constituent elements of the above-described embodiment and those of its variations, to be outlined below, may be combined as needed if it is technically feasible to do so. Such combinations of the constituent elements also fall within the scope of the present disclosure as long as the combinations include what characterizes this disclosure.

With the present embodiment above, for example, it has been explained that the output of the touch position is inhibited by changing the settings of the criteria for determining the size of the touch region or by making a substitution for the result of the determination of the touch region size. However, it is not mandatory to change the settings or make the substitution. Alternatively, in the touch output inhibited state brought about by a pen-up movement, the output part 34 may completely stop outputting the touch position or invalidate the touch position before the output to the host processor 22 regardless of the result of the determination by the determination part 32.

With the present embodiment above, it has been explained that the determination part 32 determines the size of the touch region using the first and the second ranges that are different from each other. Alternatively, the determination may be made using a predetermined common range. For example, if the size of the touch region falls within a predetermined single range defined by predetermined upper and lower limits, the touch region may be determined to be a small region (finger region), and if the size of the touch region exceeds that range, the touch region may be determined to be a large region (palm region). As a further alternative, the size of the touch region may be determined not only by such conditions as the area settings and the cross-point arrangements but also by other conditions including the lengths in the X and Y directions.

With the present embodiment above, for example, it has been explained that the touch output inhibited state is continued unless and until the cancellation condition that the touch region to be tracked is lost is satisfied. However, this cancellation condition is not limitative of the conditions for cancelling the touch output inhibited state.

The methods and the timing by which the position detection system 1 switches the operation mode are not limited to those described above. For example, although it has been stated that the operation mode is switched from the time-sharing mode to the exclusive mode upon detection of the electronic pen 2, the time-sharing mode may alternatively be maintained without switching to the exclusive mode. As another alternative, the operation mode may be switched from the time-sharing mode to the exclusive mode not at the time when the electronic pen 2 is detected but at the time when the electronic pen 2 comes into contact with the touch surface 3a.

It is to be noted that the embodiment of the present disclosure is not limited to the foregoing embodiments, and that various changes can be made without departing from the spirit of the present disclosure.

What is claimed is:

1. A position detection circuit for detecting a position of an electronic pen and a position of a passive pointer on a touch surface disposed on a capacitive touch sensor constituted by a plurality of sensor electrodes arranged two-dimensionally, the electronic pen being configured to be capable of transmitting a pen signal, the passive pointer not transmitting any signal, the position detection circuit comprising:
   at least one processor; and
   at least one memory storing instructions that, when executed, by the at least one processor, cause the position detection circuit to:
   detect a touch position indicative of the position of the passive pointer;
   output the touch position in a case where a size of a region forming the touch position is within a predetermined range; and
   operate in a first operation mode in which a pen position indicative of the position of the electronic pen is detected while the touch position is not detected, and if the electronic pen was in contact with the touch surface and becomes detached therefrom, switch from operation in the first operation mode to operation in a second operation mode in which the touch position and the pen position are detected on a time-sharing basis, wherein, if operation in the first operation mode switches to operation in the second operation mode, the output of the touch position is temporarily inhibited, wherein, if the electronic pen was in contact with the touch surface becomes detached therefrom, the output of the touch position is temporarily inhibited, and wherein, if a detection level of a currently tracked touch region becomes less than or equal to a threshold value, inhibition of the output of the touch position is canceled.

2. The position detection circuit according to claim 1, wherein the instructions, when executed, by the at least one processor, cause the position detection circuit to:

if the electronic pen was in contact with the touch surface and becomes detached therefrom, track the region which forms the touch position and of which the size is within the predetermined range, wherein the output of the touch position is kept inhibited while the region is continuously tracked, and inhibition of the output of the touch position is canceled if tracking of the region is discontinued.

3. The position detection circuit according to claim 1, wherein the output of the touch position is inhibited either by stopping the output of the touch position or by invalidating the touch position before the output thereof.

4. The position detection circuit according to claim 1, wherein the instructions, when executed, by the at least one processor, cause the position detection circuit to:

determine whether or not the electronic pen was in contact with the touch surface and becomes detached therefrom based on a writing pressure value indicative of a pressure applied to a pen tip of the electronic pen, wherein, in response to determining that the electronic pen was in contact with the touch surface and becomes detached therefrom, the output of the touch position is temporarily inhibited.

5. The position detection circuit according to claim 1, wherein the output of the touch position is temporarily inhibited based on a writing pressure value indicative of a pressure applied to a pen tip of the electronic pen.

6. A position detection system including an electronic pen and a position detection circuit, the electronic pen being configured to be capable of transmitting a pen signal, the position detection circuit detecting a position of the electronic pen and a position of a passive pointer on a touch surface disposed on a capacitive touch sensor constituted by a plurality of sensor electrodes arranged two-dimensionally, the passive pointer not transmitting any signal, wherein:

the position detection circuit includes:
at least one processor; and
at least one memory storing instructions that, when executed by the at least one processor, cause the position detection circuit to:
detect a touch position indicative of the position of the passive pointer, and
output the touch position if a size of a region forming the touch position is within a predetermined range, and
operate in a first operation mode in which a pen position indicative of the position of the electronic pen is detected while the touch position is not detected, and if the electronic pen was contact with the touch surface and becomes detached therefrom, the position detection circuit switches from operation in the first operation mode to operation in a second operation mode in which the touch position and the pen position are detected on a time-sharing basis, and, if the position detection circuit switches from operation in the first operation mode switches to operation in the second operation mode, the output of the touch position is temporarily inhibited, wherein, if the electronic pen was contact with the touch surface and becomes detached therefrom, output of the touch position is temporarily inhibited, and wherein, if a detection level of a currently tracked touch region becomes less than or equal to a threshold value, inhibition of the output of the touch position is canceled.

7. The position detection system according to claim 6, wherein:

the instructions, when executed, by the at least one processor, cause the position detection circuit to, if the electronic pen was in contact with the touch surface and becomes detached therefrom, track the region which forms the touch position and of which the size is within the predetermined range, and the output of the touch position is kept inhibited if the region is continuously tracked, and inhibition of the output of the touch position is canceled if tracking of the region is discontinued.

8. The position detection system according to claim 6, wherein the output of the touch position is inhibited either by stopping the output of the touch position or by invalidating the touch position before the output thereof.

9. The position detection system according to claim 6, wherein the instructions, when executed, by the at least one processor, cause the position detection circuit to determine whether or not the electronic pen was in contact with the touch surface and becomes detached therefrom based on a writing pressure value indicative of a pressure applied to a pen tip of the electronic pen, and, in response to determining that the electronic pen was in contact with the touch surface and becomes detached therefrom, the output of the touch position is temporarily inhibited.

10. The position detection system according to claim 6, wherein the output of the touch position is temporarily inhibited based on a writing pressure value indicative of a pressure applied to a pen tip of the electronic pen.

11. A position detection method for detecting a position of an electronic pen and a position of a passive pointer on a touch surface disposed on a capacitive touch sensor constituted by a plurality of sensor electrodes arranged two-dimensionally, the electronic pen being configured to be capable of transmitting a pen signal, the passive pointer not transmitting any signal, the position detection method comprising:

detecting a touch position indicative of the position of the passive pointer;

outputting the touch position detected by the detecting if a size of a region forming the touch position detected by the detecting is within a predetermined range;

operating in a first operation mode in which a pen position indicative of the position of the electronic pen is detected while the touch position is not detected;

if the electronic pen was in contact with the touch surface and becomes detached therefrom, switching from operation in the first operation mode to operation in a second operation mode in which the touch position and the pen position are detected on a time-sharing basis, if operation in the first operation mode switches to operation in the second operation mode, temporarily inhibiting the outputting of the touch position, wherein, if the electronic pen was in contact with the touch surface and becomes detached therefrom, the outputting is temporarily inhibited, and wherein, if a detection level of a currently tracked touch region becomes less than or equal to a threshold value, inhibition of the outputting of the touch position is canceled.

\* \* \* \* \*